C. DE G. PROFFITT.
BALANCED WATER GATE.
APPLICATION FILED OCT. 8, 1913.
1,100,445.
Patented June 16, 1914.
3 SHEETS—SHEET 1.
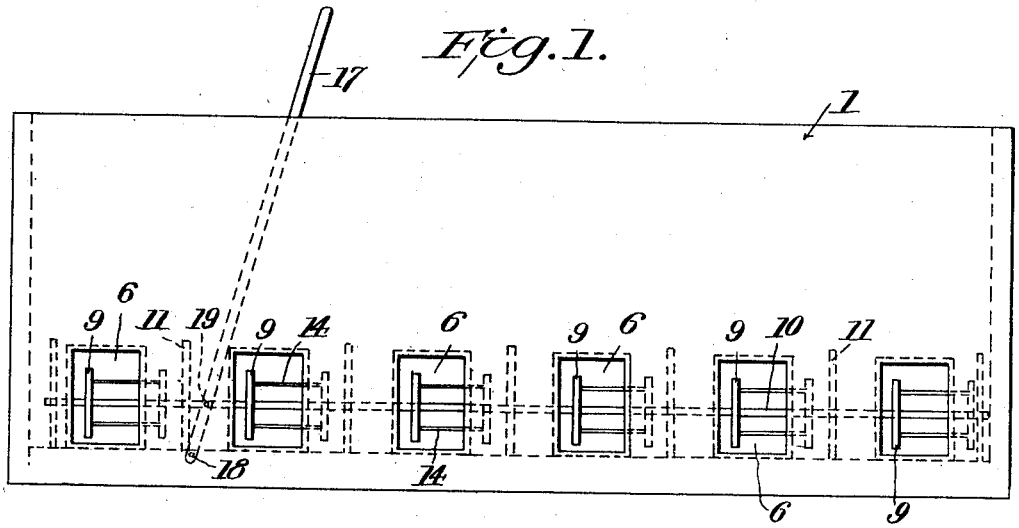
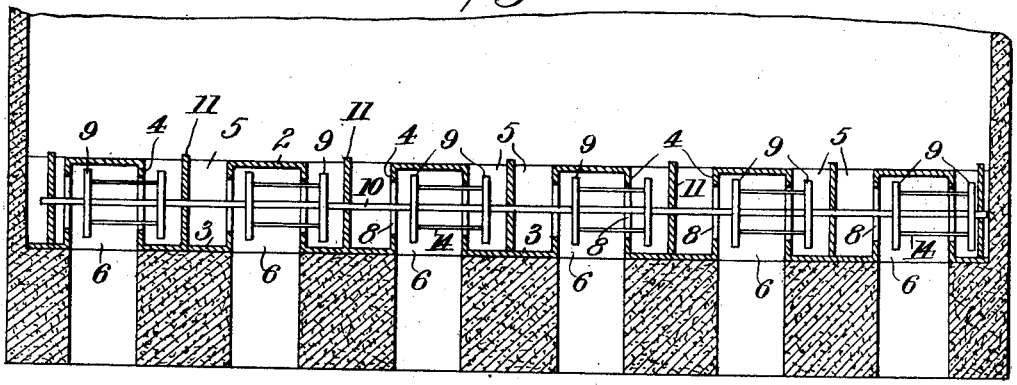
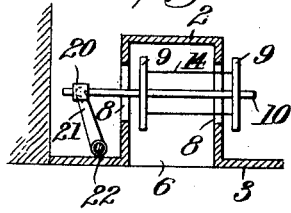
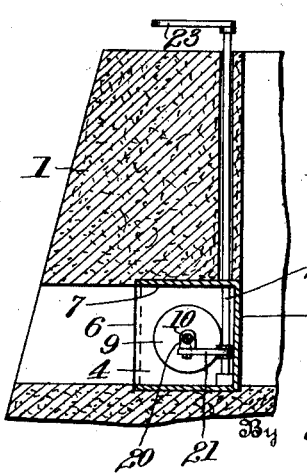
Witnesses
C. A. Walker
C. Van Sant
Inventor
C. D. Proffitt
By Watson & Boyden
Attorneys

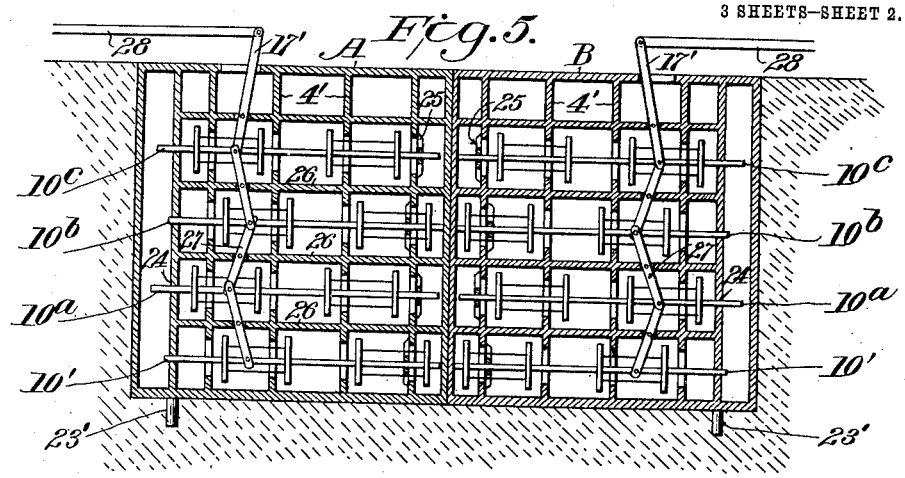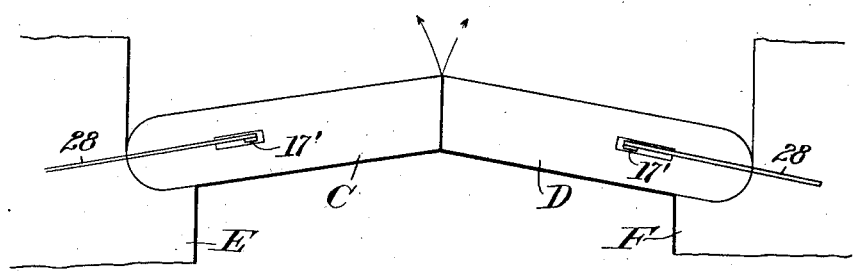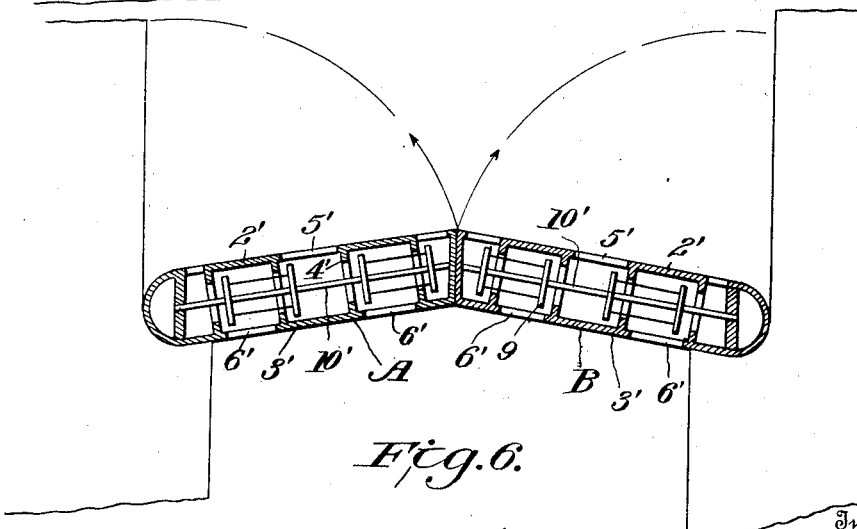

C. DE G. PROFFITT.
BALANCED WATER GATE.
APPLICATION FILED OCT. 8, 1913.
1,100,445.
Patented June 16, 1914.
3 SHEETS—SHEET 3.
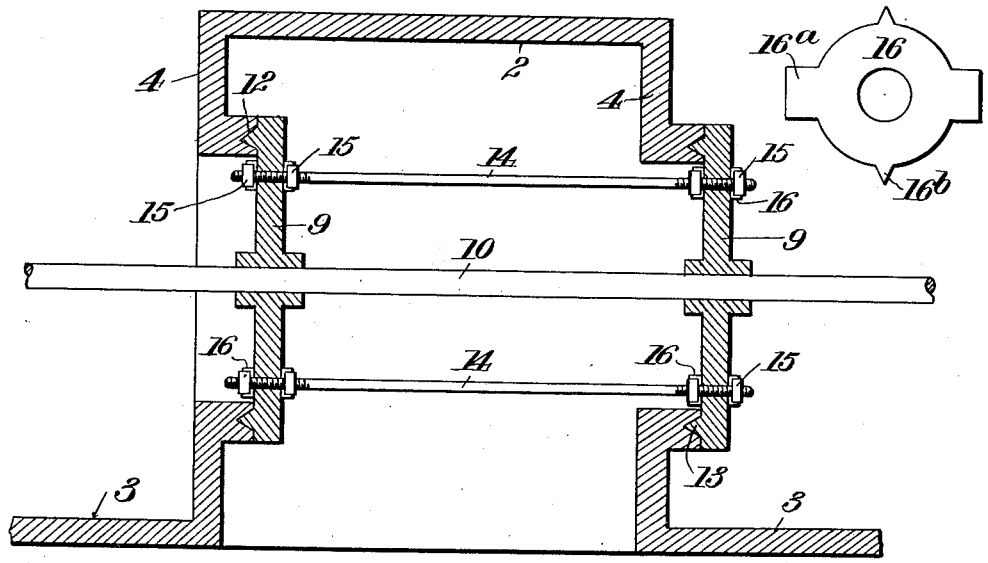
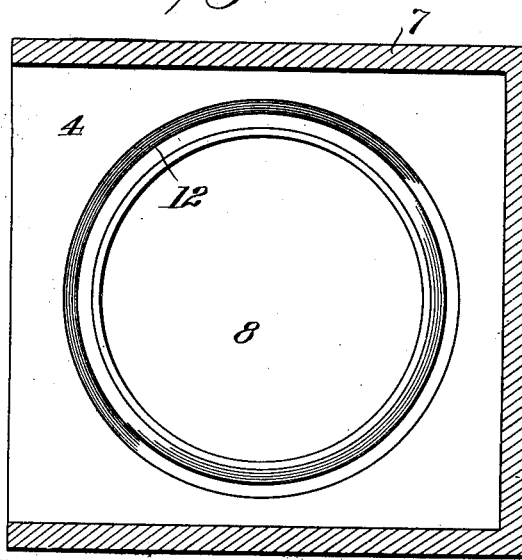
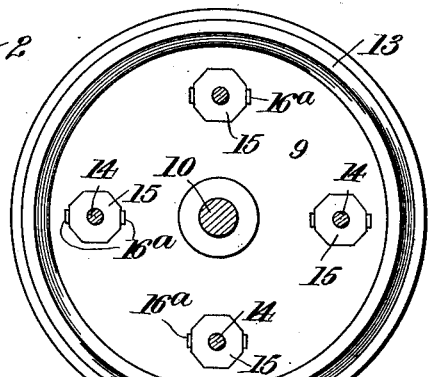

UNITED STATES PATENT OFFICE.

CHASTAIN DE GRASSE PROFFITT, OF RICHMOND, VIRGINIA.

BALANCED WATER-GATE.

1,100,445.  Specification of Letters Patent.  Patented June 16, 1914.

Application filed October 8, 1913. Serial No. 794,040.

*To all whom it may concern:*

Be it known that I, CHASTAIN DE GRASSE PROFFITT, citizen of the United States, residing at Richmond, in the county of Henrico and State of Virginia, have invented certain new and useful Improvements in Balanced Water-Gates, of which the following is a specification.

This invention relates to valves or gates for controlling the flow of water and the like.

It is particularly adapted for use in connection with dams for industrial or irrigation purposes, canal gates, etc., where comparatively large volumes of water are to be handled.

Great difficulty has been experienced with the usual sliding or swinging gates or valves, owing to the fact that the water pressure necessitates the employment of a large amount of power to unseat or open them. The result of this is that in large installations it is necessary to equip such gates either with power driven operating means or with power multiplying gearing of some kind.

It is the primary object of the present invention to provide a valve construction in which the water pressure shall be so well balanced that no appreciable power will be required to overcome it. With the use of my invention it will be possible to control large volumes of water quickly and effectively by direct manual operating mechanism, such as a simple lever.

Another object of the invention is to provide an improved valve arrangement for use in connection with the gates of canal locks, whereby such locks may be filled and emptied much more rapidly and easily than heretofore.

In order that my invention may be readily understood, reference is had to the accompanying drawings, forming part of this specification, and in which—

Figure 1 is a front elevation of a dam equipped with my improved system of balanced gates; Fig. 2 is a horizontal section thereof, parts being shown in plan; Fig. 3 is a fragmentary view similar to Fig. 2, showing a slightly modified form of operating mechanism; Fig. 4 is a vertical transverse section through a dam illustrating the operating mechanism shown in Fig. 3; Fig. 5 is a vertical central section through a pair of canal lock gates, showing my improved system of balanced valves and the operating means therefor; Fig. 6 is a plan view of a lock, showing the upper and lower gates, parts being broken away, and one of the pairs of gates being shown in section; Fig. 7 is an enlarged detailed sectional view of a single pair of my improved balanced valves; Fig. 8 is a face view of one of the valve seats, the casing being shown in section; Fig. 9 is an elevation of one of the valves, the shaft and brace rods being shown in section; and, Fig. 10 is an enlarged view of a nut lock which I may employ.

Referring to the drawings in detail, and particularly to Figs. 1 and 2 thereof, 1 designates a dam of any usual or desired construction. Along the inside of the dam near the bottom, I provide a hollow casing or barrier comprising an inner wall 2 and an outer wall 3, spaced apart, as shown. Extending between the inner and outer walls are a series of transverse partitions 4, preferably equally spaced throughout the length of the dam. Openings 5 are provided in the inner wall between alternating pairs of such partitions, and openings 6 are provided in the outer wall between other alternating pairs. In other words, one side of each partition is subject to water pressure through one of the openings 5 and the other side of each partition is adjacent one of the discharge openings 6. The valve casing is also provided with a top wall 7, as clearly shown in Fig. 4.

Each partition 4 has a passage 8 formed therethrough, and it will be observed that the disposition of the openings 5 and 6 is such that water flows through the passages in any two adjacent partitions in opposite directions.

Adapted to close the passages 8, are a plurality of valves 9, rigidly mounted on a shaft 10, supported in bearings 11 and extending substantially throughout the length of the dam. This shaft 10 is capable of longitudinal or axial movement and is adapted to be so moved by means of a lever 17, pivoted at 18 to the dam, and at 19 to the shaft, as clearly shown in Fig. 1. In the position illustrated in this figure, all of the valves are open, but when this lever is thrown to the left, it will be seen that the shaft 10 will be shifted so as to simultaneously close all of the valves.

Instead of the lever 17, the construction shown in Figs. 3 and 4 may be employed.

In this arrangement a lug 20 is fixed to the shaft 10 and is adapted to be engaged by the end of an arm 21, fixed to a vertical shaft 22, which extends upwardly to the top of the dam and is provided with an operating crank 23. In either case, it will be understood that the levers 17 or 23 may be operated directly by hand or may be attached to suitable cables or the like, for operation from a distance.

The preferred details of construction of the valves 9, and associated parts, are shown in Figs. 7 to 10. Referring to these figures it will be seen that adjacent each passage 8 in the partitions 4 is provided an annular valve seat 12, preferably having a V-shaped groove formed therein. A correspondingly shaped annular rib 13 is formed on the valve 9 and it is obvious that this rib and groove are adapted to fit together so as to form a water tight seal or joint. The valve members 9 are preferably united in pairs by means of brace rods 14, having a pair of nuts 15 at each end thereof for properly positioning the valve members. Under each nut 15 is preferably disposed a locking washer 16, having lugs 16ª adapted to be bent up in engagement with the nut, and points 16ᵇ adapted to enter the valve member.

It will be observed that all of the valves are arranged on the same side of the partitions, and that, therefore, owing to the alternating location of the openings 5 and 6, one of each pair of valves, such as illustrated in Fig. 7, closes with the water pressure, while the other closes against the water pressure. If all of the valves, therefore, are the same size as shown the result will be that the pressure against the two members of each pair will be equalized, and this will permit the shaft 10 and the entire series of valves to be moved with no greater effort than that required to merely overcome friction, and will also permit these valves remaining in any position to which they may be moved. In practice, however, it will be desirable in most cases to make one member of each pair of valves, slightly larger than the other, so that the sum total of the pressures in one direction will slightly exceed that of the pressures in the other direction. This, of course, will result in causing the valves to be self-seating, that is, there will be a tendency for the shaft 10 to be moved to the left by the pressure, and for the valves to remain closed. This will insure a tight closing, and will necessitate only a very small effort on the part of the operator in unseating the valves.

Referring to Figs. 5 and 6, I have illustrated my improved valves as applied to canal lock gates. A and B represent the lower pair of gates and C and D the upper pair of gates of a lock. These gates are adapted to turn on the usual pintles, such as 23', so as to permit boats to pass. As all of these four gates are preferably similar in construction, a description of one will suffice for all. Each gate comprises inner and outer walls 2' and 3', separated by vertically extending partitions 4'. These partitions have passages therethrough adapted to be closed by valves 9, mounted upon shafts 10', 10ª, 10ᵇ, and 10ᶜ, and the walls 2' and 3' are provided with alternately arranged openings 5' and 6'. The elements so far described correspond with those designated by similar reference characters in Figs. 1 and 2 and operate in the same manner. In the construction of Figs. 5 and 6, however, I preferably provide a plurality of shafts 10', 10ª, 10ᵇ, and 10ᶜ, arranged one above the other, and each provided with a set of valves. These sets of valves are separated from each other by means of horizontal partitions 26, so that each set works in a separate chamber. The sets of valves mounted on the shafts 10', 10ª, 10ᵇ, and 10ᶜ are preferably disposed on alternately opposite sides of the partitions 4', and all of these shafts are united by an inter-connected system of levers 27 so arranged as to move the respective valve sets simultaneously in opposite directions. The shafts carrying the valves are arranged to slide in the gate structure at one end, as indicated at 24, and are supported at the other end by any suitable means, such as brackets 25, and the system of levers 27 is connected with an operating lever 17' which projects up through the top of the gate, and is in turn connected with a link or cable 28, by means of which it can be actuated. In the position shown in Fig. 5, all of the valves are open, but when the lever 17' is shifted to the left, it will be seen that all of the sets of valves will be simultaneously moved to closed position. Since all of these valves are balanced in the manner above explained, it will be obvious that very little effort will be required to move them, and that a comparatively small movement will result in creating a comparatively large outlet for the flow of water, owing to the large number of valves employed. It will, of course, be understood that the plurality of sets of valves arranged one above the other may also be employed in connection with a dam, such as illustrated in Figs. 1 and 2, if desired, and other operating mechanism may also be employed. It will be seen, however, that with valves arranged in balanced pairs in the manner described, all possibility of sticking and jamming, due to water pressure, is avoided, and the lock or other reservoir can be quickly and easily emptied.

What I claim is:

1. The combination with a hollow wall having a series of pairs of transverse parallel partitions therein, said partitions having passages therethrough, of a plurality of pairs of valves for the respective pairs of partitions adapted to simultaneously close said passages, all of said valves being rigidly united, means for shifting said valves in a direction at right angles to said partitions, the sides of the hollow wall having openings therethrough adjacent said partitions, whereby fluid is caused to flow through the passages in the respective pairs of partitions in opposite directions when said valves are open.

2. The combination with a barrier comprising inner and outer walls, spaced apart, of a series of transverse partitions extending between said walls, said partitions having passages therethrough, valves on the same side of said partitions adapted to close said passages, and means for moving said valves toward and away from said partitions, said inner and outer walls having openings arranged alternately on opposite sides of said partitions, whereby the pressure on said valves is equalized.

3. The combination with a hollow wall, of a series of vertical, transverse partitions therein, each partition having a plurality of openings therethrough, one above the other, a plurality of sets of valves coöperating with the openings in said partitions, said sets being disposed one above the other, horizontal partitions between said sets of valves, and means for simultaneously shifting all of said valves to open or close said openings.

In testimony whereof I have affixed my signature, in presence of two witnesses.

CHASTAIN DE GRASSE PROFFITT.

Witnesses:
JAS. EGANS CUMMING,
L. C. GENTRY.

---

Copies of this patent may be obtained for five cents each, by addressing the "Commissioner of Patents, Washington, D. C."